United States Patent [19]
Watkins

[11] Patent Number: 5,490,238
[45] Date of Patent: Feb. 6, 1996

[54] ATTRIBUTE BLENDING SYSTEM FOR COMPOSING COMPUTER-GRAPHIC IMAGES FROM OBJECTS

[75] Inventor: Gary S. Watkins, Salt Lake City, Utah

[73] Assignee: Evans & Sutherland Computer Corporation, Salt Lake City, Utah

[21] Appl. No.: 310,583

[22] Filed: Sep. 22, 1994

Related U.S. Application Data

[63] Continuation of Ser. No. 116,406, Sep. 2, 1993, which is a continuation of Ser. No. 933,322, Aug. 21, 1992, abandoned, which is a continuation of Ser. No. 490,224, Mar. 19, 1990, abandoned.

[51] Int. Cl.[6] .................................................. G06T 15/40
[52] U.S. Cl. .......................... 395/122; 395/131; 395/132
[58] Field of Search ................................. 395/121, 122, 395/126, 131, 132, 129; 345/150, 149

[56] References Cited

U.S. PATENT DOCUMENTS

| | | | |
|---|---|---|---|
| 4,677,576 | 6/1987 | Berlin, Jr. et al. | 395/121 X |
| 4,748,572 | 5/1988 | Latham | 395/122 |
| 4,807,158 | 2/1989 | Blanton et al. | 395/125 |
| 4,992,780 | 2/1991 | Penna et al. | 395/122 X |
| 5,063,375 | 11/1991 | Lien et al. | 395/126 X |

*Primary Examiner*—Mark K. Zimmerman
*Attorney, Agent, or Firm*—Nilsson, Wurst & Green

[57] ABSTRACT

Objects contending for representation in pixels of a graphics display selectively are awarded a fractional area within a pixel on the basis of: coarse calculations in the Z dimension, aggregate demands of the objects and blending techniques free of binary position resolutions. Specifically, the area occupied by a polygon within a pixel is represented using a single number $\alpha$, which may variously be defined, for example, a value of "0" indicates no area occupied within the pixel, while a value of "255" indicates full pixel coverage. Fine calculations in the Z dimension for binary resolutions are avoided by the blending techniques with attendant antialiasing. A chain of mixer units for storage and blending in pipeline processing compensate the non-associative characteristic of repeated blending.

20 Claims, 5 Drawing Sheets

```
   WHEN                              WHEN
   PA ENTIRELY                       PB ENTIRELY
   IN FRONT OF PB                    IN FRONT OF PA

0        ≤     R     ≤        1
                ←17              19→

INCREASING VISUAL          INCREASING VISUAL
   PRIORITY OF PA             PRIORITY OF PB
```

ATTRIBUTE BLENDING SYSTEM FOR COMPOSING COMPUTER-GRAPHIC IMAGES FROM OBJECTS

This application is a continuation of application Ser. No. 08/116,406, filed Sep. 2, 1993, entitled "ATTRIBUTE BLENDING SYSTEM FOR COMPOSING COMPUTER-GRAPHIC IMAGES FROM OBJECTS," which is a continuation of application Ser. No. 07/933,322, filed Aug. 21, 1992 entitled "ATTRIBUTE BLENDING SYSTEM FOR COMPOSING COMPUTER-GRAPHIC IMAGES FROM OBJECTS," now abandoned, which is a continuation of application Ser. No. 07/490,224, filed Mar. 8, 1990, entitled "ATTRIBUTE BLENDING SYSTEM FOR COMPOSING COMPUTER-GRAPHIC IMAGES FROM OBJECTS, now abandoned.

BACKGROUND AND SUMMARY OF THE INVENTION

1. Field of the Invention

The invention relates to a system for use in the field of computer graphics to compose images from multiple objects, e.g. polygons, with appropriately eliminated hidden surfaces and reflecting antialiasing. Objects contending for presence in picture elements (pixels) are selected, mixed or blended by awarding a fractional area within a pixel based on range and other criteria.

Prior Development Considerations

Typically, computer graphics systems compose displays from a multitude of mathematically defined objects in model space. The objects may take various shapes, as polygons, and have various attributes, as color and obscurity. Traditionally, a viewpoint is selected and objects are individually processed in relation to the viewpoint to compose elements of a display. Of course, as the objects appear from the viewpoint, some obstruct others. A challenging problem in the field of computer graphics has been the removal of objects from the display that are hidden or obscured by other objects. Various techniques and algorithms have been developed addressing the hidden surface problem. Specifically, the hidden surface problem, along with various solutions is treated in a book, "Fundamentals of Interactive Computer Graphics", published in 1984 by Addison-Wesley and authored by James D. Foley and Andri Van Dam.

Typically, computer graphics displays are composed of individual picture elements (pixels) each of which manifests a predetermined color and intensity at a specific location in the display. When a line of sight or ray extending from the viewpoint through the pixel intercepts two or more defined objects, they contend for the area of the pixel. Consequently, a determination must be made as to the award of the pixel. In one technique of favoring the nearest object, the pixel is simply given the attributes of that object.

In processes favoring the object nearest to the viewpoint, as in a so-called depth-buffer algorithm, for each object that is possibly in the display, a determination is made of all the pixels that might reveal the object. Pixel by pixel, the contending objects then are considered and the pixel is awarded to the nearest object. Thus, the pixel carries the color and intensity of the object nearest the viewpoint which is deemed to obstruct the more remote-hidden surfaces. Conventionally, the computations attendant such operations must be performed with a high degree of accuracy and accordingly are expensive and laborious.

Assume a specific example involving objects contending for an area or picture element of a display, the objects having the distinct colors red and blue. In accordance with traditional depth-buffer algorithms, at each picture element location (pixels or a fractional area within a pixel) where the blue object is nearest the viewpoint (frontmost), blue would be displayed. The reverse would be true for areas where the red object is frontmost. Note that the decision subsequently may be altered when the prevailing object faces contention with still another object. In some situations, a pair of objects may have surfaces that are very close to each other in the depth or Z dimension. Recalling that the color of the frontmost object is displayed on the basis of precise calculations, it may be appreciated that the calculations alternately might favor one object over the other due to digital roundoff errors. That is, if the object surfaces are in very close range proximity, minor signal changes or spurious variations may cause areas to alternately display red and blue. Consequently, the area appears to scintillate providing an annoying and unreal display. The problem is characteristic of systems making a binary determination between two object attributes.

Another disturbing characteristic of images composed by pixels is called aliasing or rastering. The defect is well known in television displays and shows a staggered or staircase edge rather than a straight-line demarcation between two objects. To avoid aliasing in computer-graphics images, it has been proposed to subdivide border or transitional pixels as a basis for determining an intermediate or transitional color. For example, a pixel precisely at a border between a red surface and a blue surface might be displayed as purple with the consequence of reduced aliasing.

In performing antialiased, hidden-surface computations pixels may be subdivided to form a fractional area within a pixel as a basis for determining intermediate colors. For example, range computations might be performed to determine the frontmost of sixteen fractional areas within a pixel. Consequently, anti-aliasing techniques may grossly complicate hiddensurface calculations.

SUMMARY OF THE INVENTION

In general, the system of the present invention involves a simplified processing technique for computer-graphics data to solve the hidden surface problem with antialiasing. In that regard, the binary decision between pairs of contending polygons either is simplified or ignored. If the contending objects are widely spaced apart along the depth dimension, the pixel simply may be awarded to the nearest object. Alternatively, if the objects are relatively near (within a predetermined range of each other) the individual demands on the pixel are determined. If the demands of objects can be accommodated within the capacity of the pixel, the resulting mixture is calculated. If the demands cannot be accommodated, the attributes of the objects are mixed or blended with consideration of the relative range of the objects. Also, a series of mixer units may be interconnected to pipeline processing with improved results.

Summarizing, in accordance with the system of the present invention, hidden surface determinations may be resolved based on coarse computations when the objects involved are widely separated. For nearer objects, fractioning calculations may indicate the lack of contention for a fractional area within a pixel; and in that event, a fractional area within a pixel is simply awarded. If contention exists between objects for a fractional area within a pixel, the determination involves attribute blending, for example, blending color on the basis of the distance between the objects involved. In that regard, precise binary decisions are avoided and antialiasing is accomplished.

BRIEF DESCRIPTION OF THE DRAWINGS

In the drawings, which constitute a part of this specification, exemplary embodiments exhibiting various objectives and features hereof are set forth, specifically:

FIG. 2(a–c) is a diagram illustrating operations of a disclosed embodiment Df the present invention;

FIG. 3(a–b) is another diagram illustrating operations of the disclosed embodiment of the present invention;

DESCRIPTION OF THE ILLUSTRATIVE EMBODIMENT

As required, a detailed illustrative embodiment of the present invention is disclosed herein. However, physical graphic systems, data formats and operating components in accordance with the present invention may be embodied in a wide variety of forms, some of which may be quite different from those of the disclosed embodiment. Consequently, the specific structural and functional details disclosed herewith are merely representative, yet in that regard, they are deemed to afford the best embodiment for purposes of disclosure and to provide a basis for the claims herein which define the scope of the present invention.

Figure 1:
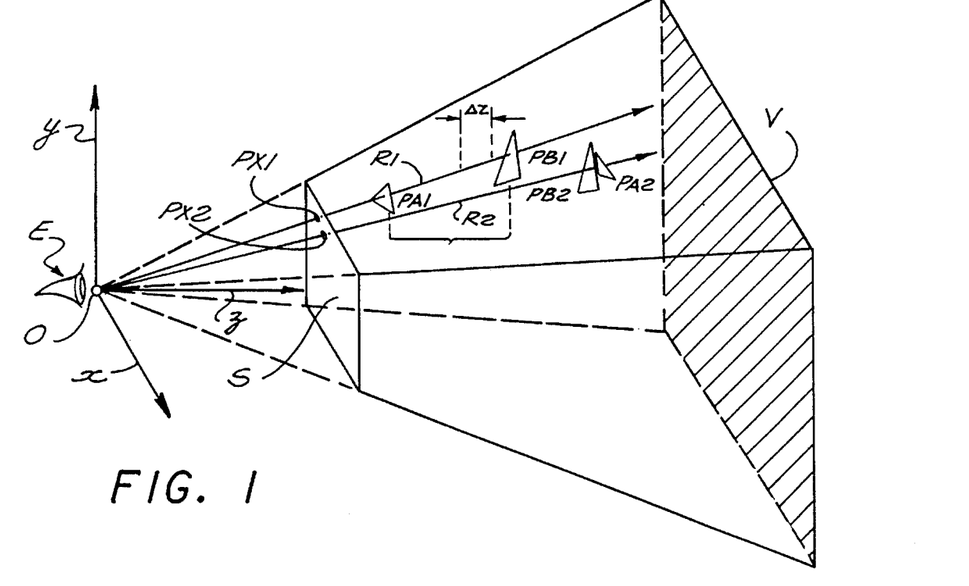
FIG. 1 is a perspective representation illustrating conceptual aspects of the present invention.

Referring initially to FIG. 1, a truncated pyramid of vision V symbolically represents a space containing objects to be viewed as simulated on a screen s. As disclosed in detail below, the system processes data representations in model space for presentation on a display screen; however, the illustration of FIG. 1 is useful to understand certain concepts of the present invention.

The viewpoint E for the screen S is symbolized by an eye. Note that in accordance with convention, dimensions relating to the space of the pyramid V are indicated from a reference 0 at the viewpoint E in dimensions x, y and z.

The system of the present invention may be variously implemented to generate displays composed from various objects as spheres, cylinders and so on. However, for convenience and in accordance with one technique, objects are represented in FIG. 1 as polygons PA and PB (with designating numbers) specifically in the form of triangles.

Extending from the reference 0, a projector or ray R1 indicates the axis of a slender pyramid (not shown) for composing a pixel PX1 at the screen S. Note that the ray R1 passes through polygons PA1 and PB1. Somewhat similarly, a ray R2 related to a pixel PX2 passes through polygons PB2 and PA2. Assume, for example, that the polygons PA and PB are opaque and that the polygons PA are red while the polygons PB are larger and blue.

Essentially, as the ray R1 intersects both the polygons PA1 and PB1, they are in contention for the pixel PX1. That is, symbolically, the screen S is somewhat analogous to a display defined by an array of picture elements (pixels) that are composed by the attributes of the polygons in the pyramid V.

If the polygon PA1 totally obscures the polygon PB1 within the slender pixel pyramid of the ray R1, the resulting pixel will be red (color of PA1). If the position of the polygons were reversed, the pixel would be blue. However, if the polygon PA1 did not fully obscure the polygon PB1 in the pixel pyramid, the polygon colors (blue and red) could be combined to produce a purple border pixel.

Assume next that along the rays R1 and R2, each of the polygons PA and PB are to be represented in the aligned pixel. That is, assume in each case that the forward polygon (nearest the reference 0) does not fully obscure the rearward polygon in the pixel pyramid. As indicated above, to accommodate antialiasing, a mixed-color pixel may be developed. Traditionally in such an event, a fractional area within a pixel would be defined and selectively awarded by precise calculations. A mixture would then be specified based on fractional determinations. However, as disclosed in detail below, and in accordance with the present invention, such expensive and laborious calculations are avoided.

Figure 2A:
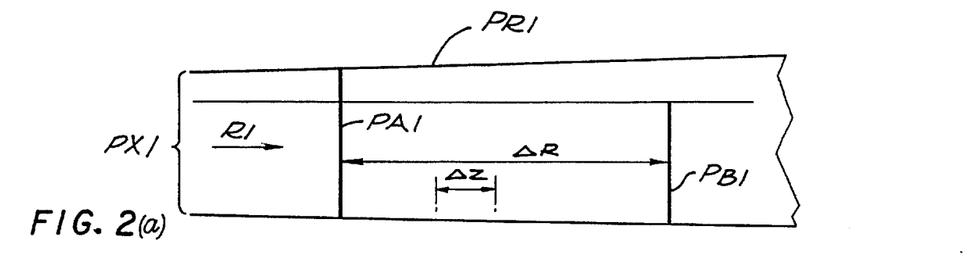

Pursuing the operation of the disclosed embodiment, the representations of FIG. 1 will now be considered in another aspect. Specifically, FIG. 2(A) shows an enlarged vertical sectional view of a pixel pyramid PR1 along the axis of the ray R1 indicating the domain of the associated pixel PX1. Fragments of the polygons PA1 and PB1 are illustrated as they contend for representation in the pixel PX1. Essentially, the polygon PA1 obstructs the polygon PB1 in relation to the pixel PX1.

In resolving contention between polygons in accordance with the present invention, a coarseness parameter $\Delta Z$ is introduced as a fixed value. The length of the predetermined coarseness parameter $\Delta Z$ in the Z dimension is illustrated in FIG. 2(A). Polygons spaced apart by a distance greater than the parameter are treated differently from those closer than the length of the parameter $\Delta Z$.

A distance $\Delta R$ also is indicated in FIG. 2(A) representing the range distance between the polygons PA1 and PB1. In resolving contention between the polygons PA1 and PB1 for the pixel PX1 as represented in FIG. 2(A), a test is performed involving the distances $\Delta Z$ and $\Delta R$. Specifically, the query determines the larger of the two distances, $\Delta Z$ or $\Delta R$.

As illustrated in FIG. 2(A), $\Delta R$ (distance between the polygons PA1 and PB1) is considerably greater than the distance $\Delta Z$ (coarseness parameter). As a consequence, the entire pixel PX1 is awarded to the polygon PA1 (nearer the viewpoint). Consequently, the pixel is given the color (red) of the polygon PA1.

The determination of $\Delta R$ versus $\Delta Z$ is performed using coarse computations, an action justified on the basis that the least significant digit in the comparison calculation may approach the value of the parameter Of course, the predetermined distance $\Delta Z$ defining the coarseness parameter, may vary widely for different image formats. As the value increases, the range calculations are simplified by eliminating less significant digits in the calculation.

Figure 2B:
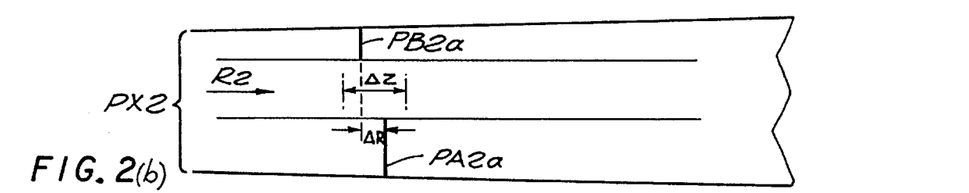

Next, consider the polygons PA2 and PB2 (FIG. 1) which are closely spaced in the Z dimension and, as indicated above, contend for the pixel PX2 defined by the ray R2. As one specific example, the situation for the polygons $PA2_a$ and $PB2_a$ might be as indicated in FIG. 2(B). Specifically, the polygons $PA2_a$ and $PB2_a$ are clearly within the defined range of the coarseness parameter $\Delta Z$. That is, the distance $\Delta R$ is less than the distance $\Delta Z$. Consequently, portions of the pixel PX2 are awarded to each of the polygons $PB2_a$ and $PA2_a$.

Figure 3A:
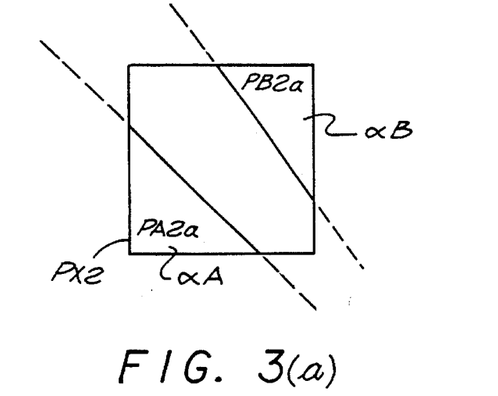

To consider the apportioning of the pixel PX2, reference will now be made to FIG. 3(A) which is an the polygons $PA2_a$ and $PB2_a$ in the pixel PX2 do not exceed enlarged plan view of the pixel at the screen S (FIG. 1). It may be seen that the combined representations of the capacity of the pixel. In accordance with the disclosed embodiment, the representation of a polygon within a pixel is specified using a parameter $\alpha$ to indicate the extent by which a polygon covers a pixel. An value of "zero" indicates that the polygon does not cover the pixel at all, while an $\alpha$ value of "one" indicates that the polygon completely covers the pixel. Pixels along the border of a polygon will generally be awarded $\alpha$ values between "zero" and "one" to indicate partial coverage of the pixel. The parameter $\alpha$ may be represented using an eight-bit integer; thus, $\alpha$ may assume one of "256" values between "0" (no pixel coverage) and "255" (complete pixel coverage). Accurate representation of partial coverage of a pixel, as may be represented through the use of an eight-bit $\alpha$ value, is an effective method for performing polygon antialiasing. Specifically, if the $\alpha$ value is computed by considering the relative contribution of a polygon to a filter function centered on the pixel, polygon antialiasing is possible to a high degree of precision. The use of filter functions to accomplish antialiasing is well known in the prior art, and is treated in Sections 2.2 and 4 of the article entitled, "An Analytic Visible Surface Algorithm for Independent Pixel Processing" by Edwin Catmull, published in *Computer Graphics*, Volume 18, Number 3 (July 1984), pages 109–115.

To return to the matter of apportioning the pixel PX2 between the polygons $PA2_a$ and $PB2_a$, $\alpha_A$ reprepolygon $PB2_a$ partially covers the pixel, and $\alpha_M$ represents the extent by which the polygon $PA2_a$ partially covers the pixel, $\alpha_B$ represents the extent by which the of the polygons $PA2_a$ and $PB2_a$ partially cover the pixel. sents the extent by which the combined representations the polygons $PA2_a$ and $PB2_a$ in the pixel do not exceed the Since as stated above the combined representations of capacity of the pixel, assume an exemplary value of "68" for $\alpha_A$ and a value of "53" for $\alpha_B$. Here the sum of $\alpha_A$ and $\alpha_B$ is "121" somewhat less than the total capacity "255" of the pixel. Accordingly, the total pixel coverage and the pixel color may be calculated using the following formulae:

$$\alpha_M = \alpha_A + \alpha_B$$

$$C_M = (\alpha_A/\alpha_M)C_A + (\alpha_B/\alpha_M)C_B$$

Application of the above formulae will result in a value of "121" for $\alpha_M$, and will result in a color $C_M$ which is a blend consisting of "68/121" of $C_A$ and "53/121" of $C_B$. Note that this blend is based entirely on the parameters $\alpha_A$ and $\alpha_B$, as well as on the colors $C_A$ and $C_B$, of the two polygons and is void of any calculations involving any determinations of frontmost pixel portions or fractional areas within a pixel.

Figure 2C:
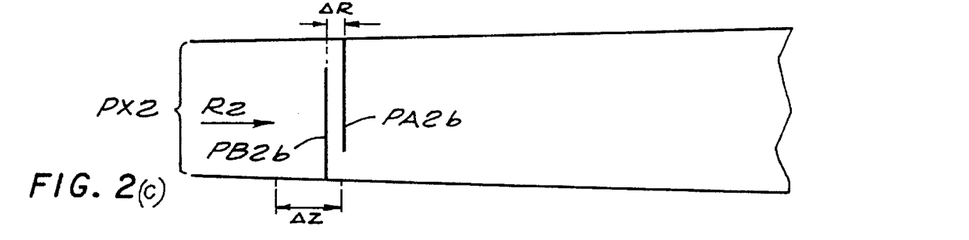
Figure 3B:
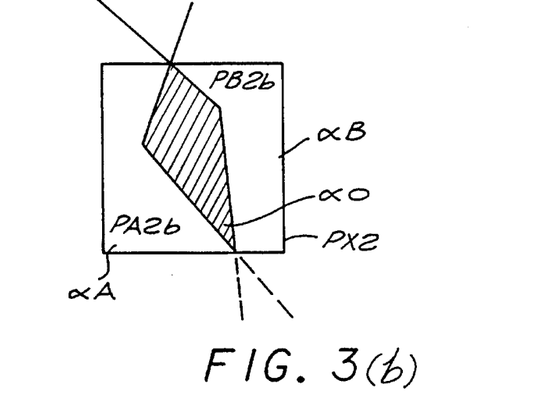

Consider now another possibility involving positions for the polygons PA2 and PB2 as illustrated by FIGS. 2(C) and 3(B), the polygons being designated $PA2_b$ and $PB2_b$. Specifically, the polygons $PA2_b$ and $PB2_b$ are within the coarseness parameter $\Delta Z$ (FIG. 2(C)) and have a total presence in the pixel PX2 in excess of the pixel's capacity (FIG. 3(B)). That is, the polygons $PA2_b$ and $PB2_b$ overlap to present a combined demand on the pixel PX2 that exceeds the area of the pixel. In this case, representations (color or other attributes) of the polygons $PA2_b$ and $PB2_b$ are blended, and in this blend, their relative range is considered. Still, the blending is void of binary determinations of the frontal polygon.

Figure 4:
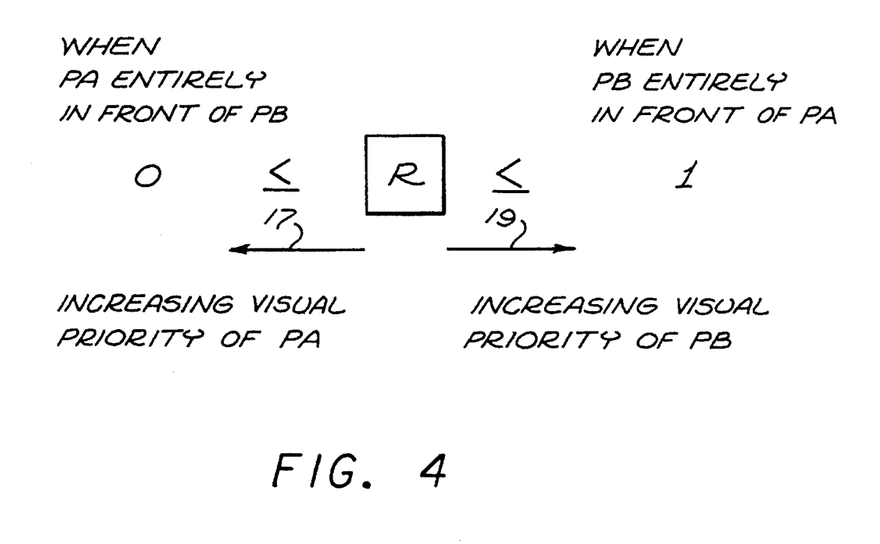
FIG. 4 is a chart illustrating a factor as employed in the disclosed embodiment of the present invention.

In one embodiment, the range consideration is introduced by a range factor R which is a function of polygon positions in the Z dimension. The range factor R may have a value between "0" and "1" depending on the positional relationship between the contending polygons in the Z dimension. The factor R and its determination is illustrated in FIG. 4. The factor R, being shown in a box 15, may vary between "0" and "1" as indicated along the horizontal dimensions, note arrows 17 and 19. The determinations involve portions of polygons specified by pixel rays or projectors. Accordingly, when a polygon portion PA is entirely in front of a polygon portion PB, R is given a value of "0". Conversely, when the polygon portion PB is in front, R is given a value of "1". The value of R varies between the extremes of "1" and "0" with the relative visual priorities of the polygon portions as illustrated in FIG. 4. While various possibilities exist for calculating and using the factor R, it may be determined by the following equation, limited to extremes of "1" and "0":

$$R = (Z_B - Z_A)/2\Delta Z + \tfrac{1}{2},$$

where $Z_A$ and $Z_B$ state the Z dimension of the polygon portion.

Returning to the parameter s, and with reference to FIG. 3(B), $\alpha_A$ indicates the portion of a pixel contended for by a polygon PA as with respect to color. Thus, the area $PA2_b$ illustrates $\alpha_A$ and the area $PB2_b$ illustrates the quantity $\alpha_B$. An operator $\alpha_M$ indicates the total portion of the pixel sought by both the polygons $PA2_b$ and $PB2_b$ and accordingly is a sum. Finally, the operator $\alpha_O$ represents an excess of demand and is illustrated in FIG. 3(B) as a shaded area $\alpha_O$.

It is noteworthy that prior work has been done involving color mixes for pixels based on the operators $\alpha_A$, $\alpha_B$ and $\alpha_M$. Specifically, the work was treated in two papers, "Compositing Digital Images" by Thomas Porter, and Tom Duff, *Computer Graphics*, Volume 18, Number 3, July 1984, and "Compositing 3-D Rendered Images" by Tom Duff, *Siggraph '85*, (ACM) Volume 19, Number 3, Jul. 22–26, 1985.

Although the referenced papers disclose blending of object attributes in individual pixels, the blending is based on either an apriori determination of foremost polygon portions or precise binary determinations of foremost polygon portions in the Z dimension. Accordingly, although the blending techniques and data treatments explained below distinguish the developments disclosed in the Duff/Porter work, the concepts are recognized as significant disclosures. One significant insight provided by the paper entitled, "Compositing Digital Images", is that areas within a pixel may be awarded to polygons without regard to the configurations in which polygons overlap within a pixel, that is, based only on the fractional areas of the pixel requested by each polygon.

Returning to considerations with the attribute of color to be blended, and s operations, mixing in one format may be specified. First, $\alpha_M$ and $\alpha_O$ may be defined as follows:

$$\alpha_M = \alpha_A \alpha_B, \text{ if } \alpha_M > 1 \text{ then } \alpha_M = 1$$

$$\alpha_O = (\alpha_A/\alpha_M) + (\alpha_B/\alpha_M) - 1, \text{ if } \alpha_O < 0 \text{ then } \alpha_O = 0$$

Thus, with both $\alpha_M$ and $\alpha_O$ limited to the range from "0" to "1" blending may be in accordance with the following equation:

$$C_M = [(\alpha_A/\alpha_M) - \alpha_o R]C_A + [(\alpha_B/\alpha_M) - \alpha_0(1-R)]C_B$$

Also, an analogue of the mixing formula indicated above may be used to calculate $Z_M$:

$$Z_M = [(\alpha_A/\alpha_M) - \alpha_o R]Z_A + [(\alpha_B/\alpha_M) - \alpha_0(1-R)]Z_B$$

As previously, $C_M$ defines the color mix and in an implementation specifies the blending of the polygon colors $C_A$ and $C_B$. The quantity $\alpha_A/\alpha_M$ specifies the portion of the pixel that would be awarded to the color of the polygon PA if no overlap $\alpha_0$ existed. Somewhat similarly, the quantity $\alpha_B/\alpha_M$ specifies the portion of the pixel awarded to polygon PB in the absence of overlap $\alpha_0$. The quantities $\alpha_0 R$ and $\alpha_0(1-R)$ specify the fractions designating adjustments in the event of overlap. As indicated above, the quantity R indicates the proximity of the polygons in the Z dimension.

The above mixing equation for $C_M$ expresses an apportionment based solely on the demands of the individual polygons, if the demand can be satisfied as explained above. That is, for apportionments as illustrated in FIG. 3(A), the quantity $\alpha_0$ is zero with the consequence that the terms involving the factor R drop out of the equation.

For overlapping apportionments of the type illustrated in FIG. 3(B), determinations in accordance with the equation again include the area represented by the quantity $\alpha_0$, i.e. the q.verlap between the polygons as illustrated. If the factor R is one, then the polygon PB wins the overlap completely. Conversely, if the factor R is zero, then the polygon PA wins completely.

Further, considering the mixing equation for $C_M$, assume now the presence of an overlap as represented by $\alpha_0$. If the range factor R is one, the quantity $\alpha_0 R$ will represent the entire overlap which will be taken from the fraction $\alpha_A/\alpha_M$. Concurrently, when the factor R is one, the quantity $\alpha_0(1-R)$ becomes zero with the result being the fraction $\alpha_B/\alpha_M$ in the equation.

Sununarizing the alternative extremes, where R is zero, the quantity $\alpha_0 R$ becomes zero and the fraction $\alpha_A/\alpha_M$ is unreduced so that the polygon A receives its full share. Concurrently, as R is zero, the quantity $\alpha_0(1-0)$ reduces to $\alpha_0$ (the overlap) which is taken from the fraction $\alpha_B/\alpha_M$. The cases may be concisely stated:

| If: | Then |
|---|---|
| R = 0 | $C_M = [\alpha_A/\alpha_M]C_A + [(\alpha_B/\alpha_M) - \alpha_0]C_B$ |
| R = 1 | $C_M = [(\alpha_A/\alpha_M) - \alpha_0]C_A + [\alpha_B/\alpha_M]C_B$ |
| R = ½ | $C_M = [(\alpha_A/\alpha_M) - 1/2\alpha_0]C_A + [(\alpha_B/\alpha_M) - (1/2\alpha_0)]C_B$ |

For intermediate values of R, there is a division of the overlap. Essentially, the equation may be seen to implement yielding of the color $C_A$ (polygon PA) to the color $C_B$ (polygon PB) as R increases.

Relating values of the factor R to positions of the polygons PA and PB, when R is "0" polygon PA is in front of polygon PB by the distance ½$\Delta Z$ (see FIG. 2(A)). Conversely, when R equals "1" polygon PB is in front of polygon PA by the distance ½$\Delta Z$ When R is "½", the polygons occupy the same position in the Z dimension.

Figure 5:
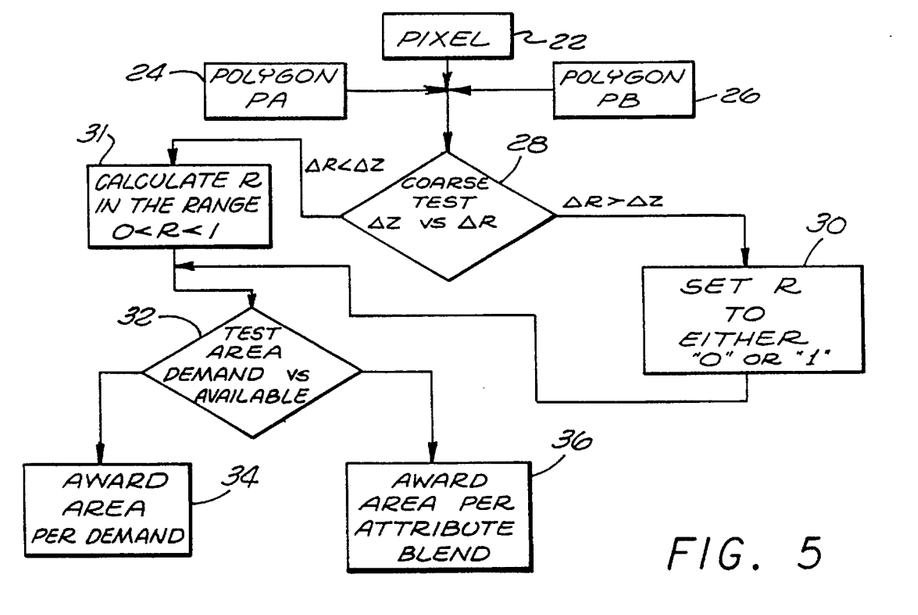
FIG. 5 is a flow diagram illustrating a fragment of the disclosed process.

In view of the above description of the process (physical and mathematical), the chart of FIG. 5 will now be considered to illustrate the flow of steps or operations. As illustrated, a pixel under consideration is specified or defined as indicated by a block 22. Essentially, a pair of polygons PA and PB contend for the pixel defined by the block 22. Accordingly, definitive information for the polygons PA and PB is represented by the blocks 24 and 26. Based on the specified pixel and the data defining the polygons PA and PB, a query or test is executed as represented by the block 28. Specifically, a coarse determination is made of the space between the polygons PA and PB ($\Delta R$) in relation to the distance $\Delta Z$. Note that in view of the coarseness of the comparison, several digits of lesser significance are eliminated.

If the distance $\Delta R$ is greater than the distance $\Delta Z$, then as indicated by the block 30, R is set to either "0" (polygon PA is in front of polygon PB) or "1" (polygon PB is in front of polygon PA). The process then advances to block 32. If, however, the distance dR is less than the distance $\Delta Z$, then R will be calculated as a value between "0" and "1" as indicated by the block 31 and as depicted in FIG. 4. The process then advances to block 32.

Within block 32, a determination is made as to the degree of demand on the pixel. A test determines the greater of the joint demand DE by polygons PA and PB versus the capacity AV of the pixel. If the combined demand is less than the available area (DE<AV), the pixel is subdivided according to demand (see FIG. 3(A)). Conversely, if the demand exceeds the availability (DE>AV), a blend or mixing is accomplished (see FIG. 3(B)). Of course, the blend may be variously performed; however, in the disclosed embodiment the blend involves the quantity R, related to the range or distance in the Z dimensien between the contending polygons. The blending operation accordingly is represented by a block 36 in FIG. 4.

Recapitulating, the process involves defining the content of individual pixels, specifically as between the attributes of a pair of contending polygons. That is, concern is with blending and in that regard, resolving hidden surfaces with antialiasing. As explained above, color affords a convenient exemplary attribute for blending. Of course, other attributes may be similarly blended. As another consideration, in the treatment above, polygons were deemed opaque; in that regard, the attribute of obscurity is treated below.

Generally, the above descriptions have treated color as the polygon attribute to be resolved. In that regard, other attributes are very significant, e.g. obscurity. Essentially, an object may have various degrees of obscurity, the inverse characteristic of transmissivity. A solid or opaque object is totally obscure and reveals none of the surfaces it hides. However, an object with less than one hundred percent obscurity reveals hidden surfaces to some extent. In the prior art, $\alpha$ may be used to specify both the extent by which an object covers a pixel as well as the relative obscurity of an object, as explained in the paper entitled, "Compositing Digital Images". This dual use of $\alpha$ may be exploited by the blending formulae of $C_M$ and $Z_M$ explained above. An alternate approach is to define a separate parameter 0 to represent obscurity, permitting the use of the parameter $\alpha$ to represent only the extent by which an object covers a pixel. The separation of O and $\alpha$ results in more flexibility for specifying the obscurity of an object, as well as the extent by which that object covers a pixel. In accordance with this approach, the equation explained above may be expanded to include obscurity factors $O_B$ and $O_A$ to account for obscurities of the polygons PB and PA respectively. Again, $C_M$ should be limited to a value of "1" in view of the obscurity factors. Accordingly, the formulae for $C_M$, $Z_M$ and $O_M$ would be:

$$C_M = [(\alpha_A/\alpha_M) - \alpha_o R O_B]C_A + [(\alpha_B/60_M) - \alpha_0(1-R)O_A]C_B \text{ if } C_M > 1$$

then $C_M=1$ $Z_M=[(\alpha_A/\alpha_M)-\alpha_0 R O_B]Z_A+[(\alpha_B/\alpha_M)-\alpha_0(1-R)O_A]Z_B$ if $Z_M>1$ then $Z_M=1$ $O_M=[(\alpha_A/\alpha_M)-\alpha_0 R O_B]O_A+[(\alpha_B/\alpha M)-\alpha_0(1-R)O_A]O_B$ if $O_M>1$ then $O_M=1$ where "1" represents the maximum values for $C_M$, $Z_M$ and $O_M$. Typically, both $C_M$ and $O_M$ may be represented using eight or ten-bit numbers, implying maximum values of "255" or "1023" for $C_M$ and $O_M$. However, $Z_M$ requires more precision, perhaps twenty-four bits, implying a maximum value of "16,777,215" for $Z_M$.

By mixing color with consideration of obscurity, representative pixels are accomplished. Note that the attribute of obscurity is introduced with respect to the overlap fragment of the pixel.

The above considerations generally have involved two polygons PA and PB contending for a pixel. In fact, several polygons may contend for a pixel. Consequently, often in the sequential processing of polygons, prior mixtures will be mixed again. For example, the mixture of attributes of polygons PA and PB may be represented as PM, and subsequently mixed with the attribute of a polygon PC. Accordingly, the equations defining the process would then involve PM and PC, rather than PA and PB as explained above.

Turning now to structural considerations, a general embodiment of the operating system as explained above is represented in FIG. 6. In that regard, a display system 50 (upper left) processes display data to select portions of polygons in relation to a viewpoint and performs scan conversions as well known in the prior art. Scan conversion techniques are described in the above-referenced book, "Fundamentals of Interactive Computer Graphics" beginning at page 456.

Essentially, polygons are treated as they impact pixels as illustrated in FIG. 1. Thus, the content of pixels is determined by sequential treatment of polygons. Such techniques also are described in a book entitled, "Principles of Interactive Computer Graphics" Second Edition, published in 1979 by McGrawHill Book Company and written by William M. Newman and Robert F. Sproull. The display system 50 functions with elements of the present invention as separately illustrated to accomplish display data for pixels in a frame buffer 52, various forms of which are well known and widely used in the prior art. Accordingly, the frame buffer 52 might accommodate storage of several bits per pixel as to store representations of color, intensity and so on.

The display system 50 is connected to a pixel processor 54 which stores and processes sets of data within a pixel in the sequence of scan conversion. In that regard, each polygon within a scene (pyramid of vision) must be considered with respect to each pixel for determination of presence in the scene. Again, such processes are well known in the prior art as is apparatus for their execution. Accordingly, techniques of the prior art are readily available for use in the processor 54 to provide pixel data on a selective basis. Note that in FIG. 6 components are separately illustrated in the interests of disclosure and ease of explanation. It is to be recognized that operating systems are likely to implement a somewhat more integrated arrangement.

Figure 6:
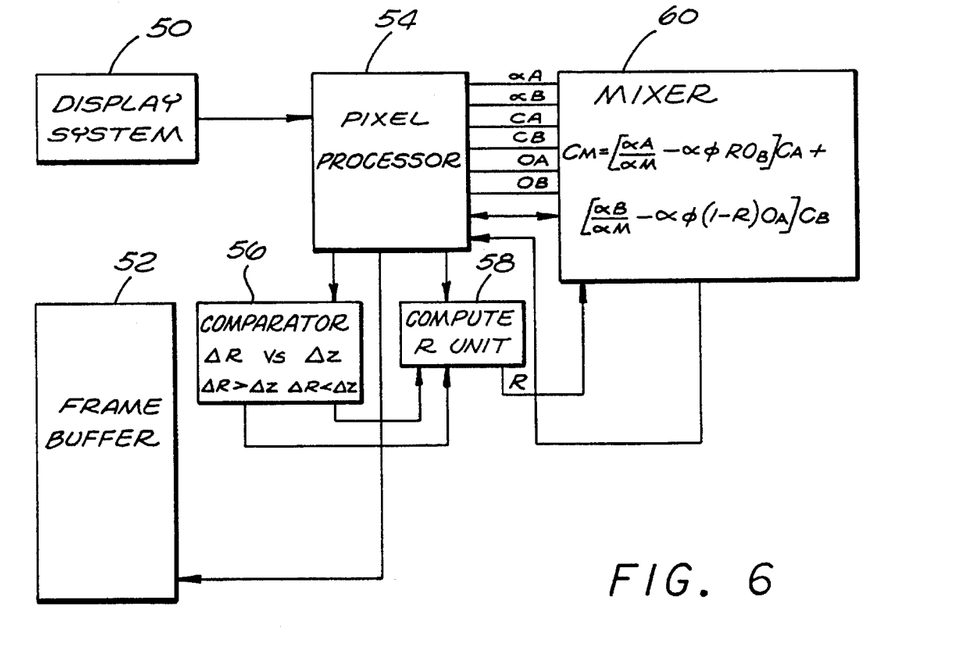
FIG. 6 is a block diagram of a structure constructed in accordance with the present invention.

As illustrated in FIG. 6, the pixel processor 54 supplies positional Z-dimensional data both: (1) for a new pixel from a currently processed polygon and, (2) for previously blended data for that pixel, to a comparator 56. Essentially, the comparator 56 determines the greater of the distances $\Delta R$ and $\Delta Z$ as explained above and accordingly provides binary outputs that are high to indicate that either: $\Delta R>\Delta Z$ or $\Delta R<\Delta Z$. If the output signal indicates $\Delta R>\Delta Z$, the compute R unit 58 sets R to either "0" or "1". Alternatively, if $\Delta R<\Delta Z$, the computer R unit calculates a value for R in the range $0<R<1$.

Considering the detailed operation of the structure of FIG. 6, assume the display system 50 has previously supplied pixel data for polygon PA, and currently supplies pixel data for polygon PB, to the pixel processor 54. The processor 54 can provide various values to: the comparator 56, a compute R unit 58 and the mixer 60. Specifically, the processor 54 provides a representative quantity of the distance dR to the comparator 56 which stores a predetermined value of the coarseness parameter $\Delta Z$. Accordingly the comparison is performed.

The pixel processor 54 also provides signals to the mixer 60 representative of $\alpha_A$, $\alpha_B$, $C_A$, $C_B$, $O_A$ and $O_B$. Signals representative of the Z-dimensional values for calculation of the range factor R are supplied to the unit 58. The value of the factor R is computed by the unit 58 and supplied to the mixer 60 along with values from the processor 54 as indicated. Accordingly, the mixer may execute the blending equation as illustrated:

$C_M=[(\alpha_A/\alpha_M)-\alpha_0 R O_B]C_A+[(\alpha_B/\alpha_M)-\alpha_0(1-R)O_A]C_B$.

As indicated above, the mixer calculates the quantity $C_M$ and supplies a representative signal through the processor 54 which determines the pixel blend for the frame buffer 52.

In a practical system, the structure of FIG. 6 would be expanded to progressively process polygons. For example, the system might process polygons PA and PB with respect to a pixel to produce a polygon mix $PM_B$. Thereafter, the polygon mix $PM_B$ would be processed with polygon PC to produce a polygon mix $PM_C$. Accordingly, the progression might be represented as follows:

$PA+PB=PM_B$ $PM_B+PC=PM_C$ $PM_C+PD=PM_D$ $PM_D+PE=PM_E$ $PM_E+PF=PM_F$ $PM_F+PG=PM_G$

From the progression, it may be seen that for each pixel, polygons of concern are treated to ultimately generate a properly representative pixel for the display. However, note that the process in accordance with the above progression is not associative. For example, if mixtures or blends are performed to the level of the polygon mixture $PM_G$ in the above progression, it is apparent that the representative shares of polygons PA and PB are substantially diluted. Consequently, a system will now be described to accomplish progressive polygon mixing, with compensation for nonassociative dilution.

Conceptually, the operation of the system involves an operation concurrent with mixing, to separate certain contending polygons based on their position in the Z dimension. In that regard, some mixing operations are delayed. Essentially, a plurality of storage and mixer units are cascaded, each to performing the operation as described with respect to FIG. 6. For example, the polygons PW and PY are segregated as the polygon PW is held in a mixer unit while the polygon PY is advanced to a subsequent mixer unit. Although various numbers of mixer units may be utilized, in embodiments of the system, three storage and mixer units have been determined to be quite effective. The segregation operation is somewhat illustrated conceptually in FIG. 7.

Figure 7:
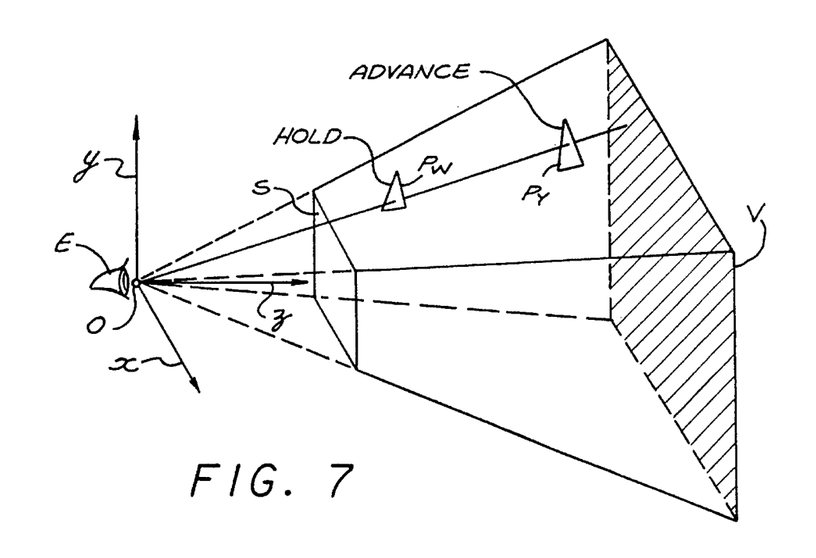
FIG. 7 is a perspective representation illustrating an operating aspect of the present invention.

A pyramid of vision V is represented in FIG. 7 as previously described with reference to FIG. 1. Note that similar letters are employed to identify similar components. Generally, the series of mixers tend to divide polygons somewhat along the Z dimension. For example, as between a pair of widely separated polygons PW and PY, with respect to a predetermined pixel, the more remote polygon PY is moved to the storage of an advanced mixer unit. Thus, a classification and separation of polygons occurs in that unmixed polygons tend to be moved to advanced storage and mixer units.

When all of the polygons have been treated, the contents of the storage and mixer units is collapsed (step by step) resulting in additional and final mixing. Accordingly, the polygons as the polygon PW are imposed on the rearmost polygons as the polygon PY.

Again, the sections 56, 58 and 60 as illustrated in FIG. 6 are neither precise nor are separation rigorous; however, the sections do conceptually illustrate the functional cooperation of the mixers segregate polygon contributions to pixels so as to compensate for the associative character of the mixing process.

Considering an embodiment for processing polygons on a pixel-by-pixel basis as related to the above description, reference will now be made to FIG. 8. Three storage and mixer units are illustrated, specifically units M1, M2 and M3. While varying numbers of units may be employed, indications bode variably for a three-unit format.

Figure 8:
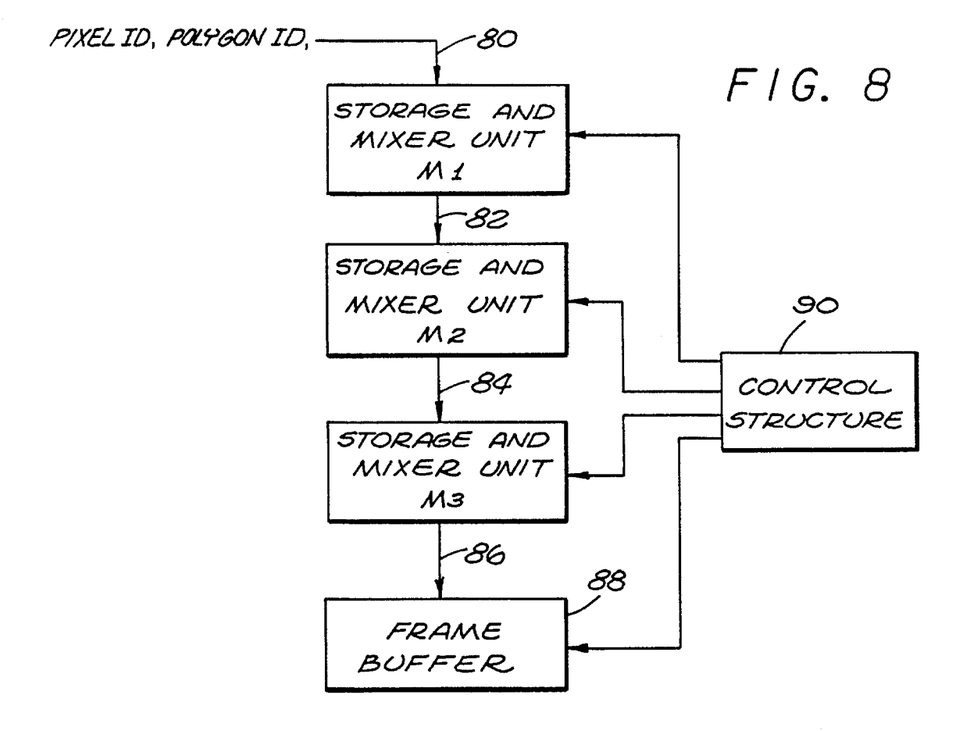
FIG. 8 is a block diagram of a processor configuration constructed in accordance with the present invention.

Referring to the structural embodiment of FIG. 8, storage and mixer units M1, M2 and M3 are interconnected by buses so that pixel and polygon data is supplied to the unit M1 through a bus 80. The data selectively passed from the unit M1 through a bus 82 to the unit M2, may be further selectively passed from the unit M2 to the unit M3 through a bus 84. Finally, mixed pixel data is passed from the unit M3 through a bus 86 to a frame buffer 88. Control of data flow within and between the units M1, M2 and M3 is largely internal as explained in detail below; however, sequencing operations and overall supervision is provided by a control structure 90.

The storage and mixer units M1, M2 and M3 each incorporate apparatus as illustrated in FIG. 6 to test polygon data for individual pixels and selectively resolve allocations as explained with respect to FIG. 4. Furthermore, the units M1, M2 and M3 each incorporate storage capability for retaining polygon data either mixed or unmixed. Generally, when the data for one polygon is mixed with another polygon (or prior data) for a pixel, the data is retained in the active mixer unit. However, when no mixing occurs and mixing is delayed, the more remote polygon data is passed to the next mixer unit in the-sequence as illustrated in FIG. 8.

Generally, all polygons of a display are processed in the structure of FIG. 8 for all pixels of a display in accordance with well known scan conversion and sequential techniques of the prior art. In accordance with the present development, the processing is as illustrated in FIG. 5 involving an initial coarse test regarding the coarseness parameter and the subsequent award of a fractional area within a pixel either via a mixing operation or via a delayed mixing operation.

In the operation of the system of FIG. 8, pixel identification data and polygon identification data are supplied to the storage and mixer unit M1 through the bus 80. The data is supplied in sequence and in that regard polygons are processed according to the schedule as indicated above, i.e. PA+PB=$PM_B$, PMB+PC=$PM_C$, and so on. Summarizing the progression, data involving polygons that are more remote from the viewpoint E (FIG. 7) tend to progress into the mixer unit M3. On the contrary, data of nearer polygons tend to remain in the mixer unit M1.

After all of the polygons have been processed, the data in the mixer units M1, M2 and M3 are essentially collapsed and delayed mixing occurs by moving from the mixer unit M1 into the mixer unit M2 and subsequently into the mixer unit M3. Final mixing occurs in the unit M3 from which the resulting image data is supplied to the frame buffer 88. The operation of the structure of FIG. 8 will now be considered with respect to the process flow diagram of FIG. 9.

Figure 9:
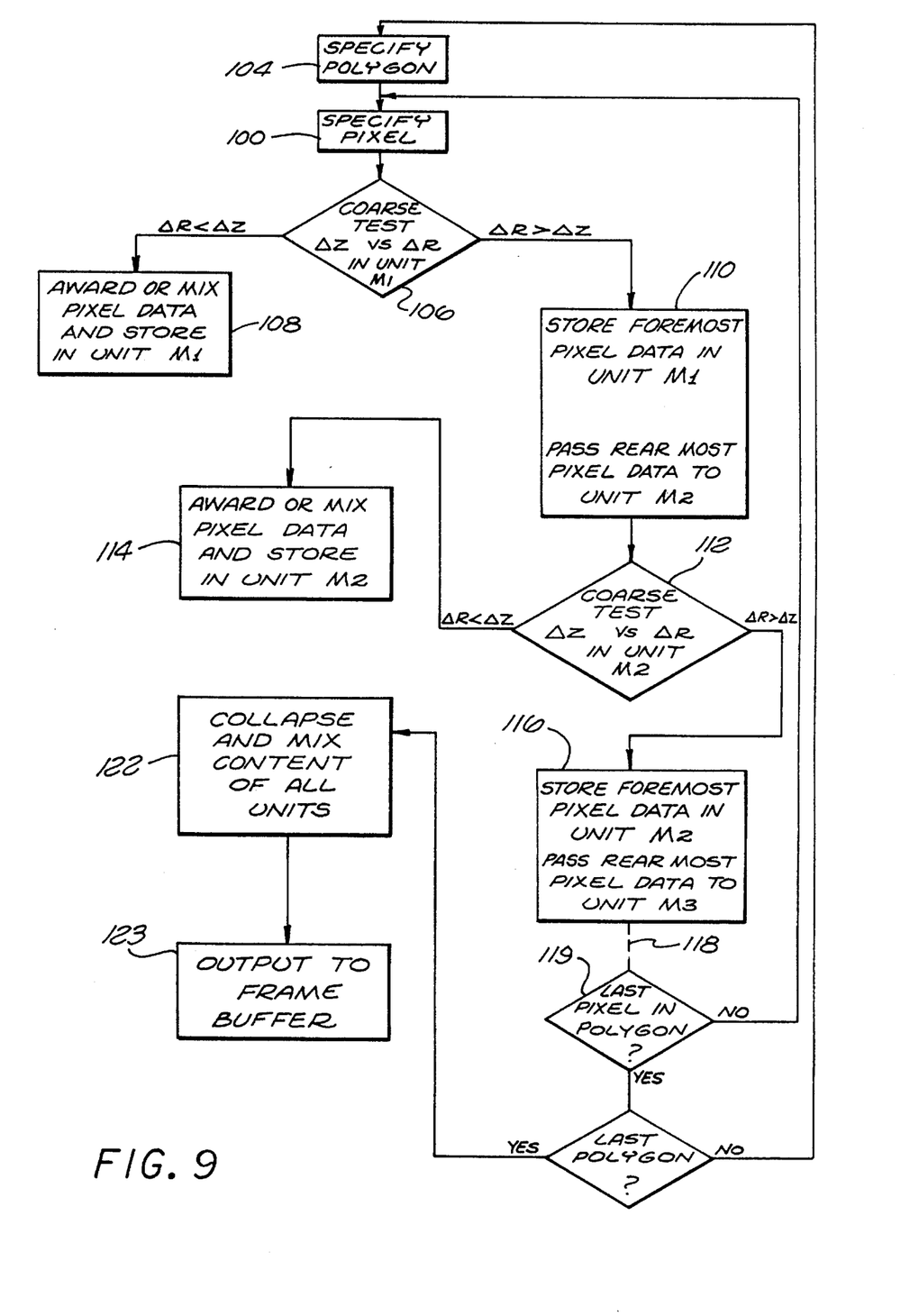
FIG. 9 is a flow diagram illustrating the operating process of the configuration of FIG. 8.

Pixel data and polygon data are provided as indicated by the blocks 100 and 104. Specifically, pixels are specified in terms of x and y values for progressive treatment with respect to each polygon. For example, assume that the polygon PA was previously scan converted and data for that polygon was stored for specific pixels. Then assume that the polygon PB specified by the block 104 is scan converted to produce data within specific pixels. Within a given pixel specified by the block 100, data produced for the polygon PB, as well as data previously stored for the polygon PA, are then tested as indicated by the block 106 to determine the relationship of the distances dR and $\Delta Z$ as explained in detail above. If $\Delta R<\Delta Z$, the next process step is as indicated by the block 108. Specifically, a determination is made as explained above and mixed pixel data is produced, either shared or blended as described above. The resulting polygon data for the pixel is then stored in the unit M1.

If the test of block 106 indicates the distance $\Delta R$ to be greater than the distance $\Delta Z$, rather than to share or blend pixel data as described above, pixel data for the frontmost polygon is retained in the unit M1 while pixel data for the rearmost polygon is supplied through the bus 82 (FIG. 8) to the unit M2. The effect of passing the pixel data for the rearmost polygon to the unit M2 is to delay mixing until the final mixing operation.

With the appearance of fresh polygon data in the unit M2, another test is performed as indicated by the block 112. The test of block 112 is similar to that of block 106; however, the test of block 112 is executed in the storage and mixer unit M2. Again, if the polygon data indicates small separation as described above, the content of the pixel is resolved as described above as by the process step represented by the block 114. Conversely, if the represented polygons are widely separated, the process proceeds as indicated by the block 116. Specifically, the foremost polygon pixel data is stored in the unit M2 while the more remote or rearmost pixel data is supplied to the unit M3, again delaying mixing.

As indicated above, varying numbers of storage and mixer units may be employed as indicated by the dashed line 118 of FIG. 8. However, as indicated by the block 119, a test is performed to indicate the last pixel for a given polygon. Until the last pixel has been processed, the process cycles to the block 100 in order to specify a new pixel. Then, as indicated by the block 120, a test is performed to signify the last polygon. Until the last polygon has been processed, the process cycles to the block 104 in order to specify a new polygon; however, thereafter the contents of the storage and mixer units is collapsed and delayed mixing occurs as a series of final mixing operations. Specifically, as indicated by the block 122, the contents of the mixer unit M1 are moved into the mixer unit M2 and treated as polygon PB data, and the contents of the mixer unit M2 are treated as polygon PA data. R is set to "1" to indicate that PB has visual priority over PA, and blending occurs in the mixer unit M2. Next, the contents of the mixer unit M2 are moved into the mixer unit M3 and treated as polygon PB data, and the contents of the mixer unit M3 are treated as polygon PA data. R is again set to "1" to indicate that PB has visual priority over PA, and blending occurs in the mixer unit M3. As can be appreciated from the above discussion, 35 the blending in sequence of the contents of pairs of adjacent mixer units accomplishes delayed mixing and properly assigns visual priority for those cases where an earlier, coarse test of dR rs. ΔZ called for delaying mixing by passing more remote polygon data to the next mixer. Finally, processed data is supplied to the frame buffer from the mixer unit M3, the step being illustrated by a block 123.

Essentially, the data is processed in sequence, beginning with the frontmost data. Thus, a particular datum will only get that portion of the pixel left after the processing of all data in front of that particular datum. Therefore, only the frontmost data receives the portion it requests of the pixel area. The rearmost data will only get that portion of the pixel left after all other data has been processed.

In view of the above explanations and descriptions, it will be apparent that the system of the present invention avoids binary decisions in solving hidden surface problems so that oscillations between two colors are avoided. Also, the system facilitates simplified computations which solve the hidden surface problem with antialiasing. The system further accommodates blending operations with regard to polygon attributes to accomplish effective displays as on the basis of depth dimension. In that regard, the Z blending aspect of the system affords distinct advantages as will be apparent to one skilled in the art. Recognizing the significance of such key aspects of the system, it is to be understood that a wide variety of techniques and apparatus may be employed in accordance with the present invention, depending upon the objectives involved, the structures and operating formats. Consequently, the scope hereof is deemed to be appropriately determined by the claims as set forth below.

What is claimed is:

1. In a computer graphics display apparatus including a frame buffer to drive a pixel display, a system to provide picture element (pixel) signals to said frame buffer for an anti-aliased display of polygons that are defined as located at various depths along a depth dimension in a pyramid of vision (model space), the pyramid of vision being defined by a view point having at least one ray associated with a pixel of said contending display, said ray passing through certain of said contending polygons at various points of said polygons, said contending polygons having attributes contending for said pixel, said display being defined in two dimensional space within said pyramid of vision, and further having a determined coarseness parameter indicated in the depth dimension, said system comprising:

means for providing representative signals for each of, a forward contending polygon and a rearward contending polygon, in the depth dimension of model space, said forward contending polygon having a forward point along said ray in said depth dimension, said rearward contending polygon having a rearward point along said ray in said depth dimension;

means for determining representative signals for the distance in said depth dimension between said forward point and said rearward point in model space;

means for providing representative signals for said coarseness parameter in model space;

means for computing blended attribute pixel data signals, said blended attribute pixel data signals being a blended attribute of said forward and rearward polygons, by correlating said representative signals for said distance in said depth dimension between said forward and said rearward points with signals representative of said coarseness parameter; and means for storing said blended attribute pixel data signals in said frame buffer for driving a computer graphics pixel display.

2. A computer graphics system according to claim 1 wherein said contending polygons have attributes to represent color and said computing means computes a blended attribute of color.

3. A computer graphics system according to claim 1 wherein said contending polygons have attributes to represent obscurity and said computing means computes a blended attribute of obscurity.

4. A computer graphics system according to claim 1 wherein said contending polygons have attributes to represent depth and said computing means computes a blended attribute of depth.

5. A computer graphics system according to claim 1 further comprising means for conditionally actuating said means for computing blended attribute pixel data signals controlled by said distance in relation to said coarseness parameter.

6. A computer graphics system according to claim 1 wherein said means for computing blended attribute pixel data signals computes said blended attribute pixel data signals in accordance with the equation:

$$A_M = [(\alpha_A/\alpha_M) - \alpha_0 R]A_A + [(\alpha_B/\alpha_M) - \alpha_0(1-R)]A_B$$

where $A_M$ is said blended attribute for said pixel, $\alpha_A$ represents pixel coverage of said forward point of said forward polygon, $\alpha_B$ represents pixel coverage of said rearward point of said rearward polygon, $\alpha_M$ represents a combined pixel coverage of said rearward and forward points, $\alpha_0$ represents excess of said combined pixel coverage beyond capacity of said pixel, $A_A$ represents said attribute of said forward polygon and $A_B$ represents said attribute of said rearward polygon, and R represents said correlated distance.

7. A computer graphics system according to claim 6 wherein said correlated distance R is defined in accordance with the equation:

$$R = \frac{(Z_B - Z_A)}{2\Delta} + \frac{1}{2}$$

where $Z_R$ represents position of said rearward point along said ray in said depth dimension, $Z_A$ represents position of said forward point along said ray, and $\Delta Z$ represents said coarseness parameter.

8. A computer graphies system according to claim 6 wherein said contending polygons have attributes to represent obscurity and said equation further includes parameters $O_A$ and $O_B$ representative of said obscurity of said forward polygon and said rearward polygon, respectively, as follows:

$$A_M = [(\alpha_A/\alpha_M) - \alpha_0 RO_B]A_A + [(\alpha_A/\alpha_M) - \alpha_0(1-R)O_A]A_B$$

9. A computer graphics system according to claim 6 wherein said combined pixel coverage $\alpha_M$ and said excess pixel coverage $\alpha_0$ are defined in accordance with the equations:

$$\alpha_M = \alpha_A + \alpha_B, \text{ if } \alpha_M > 1, \text{ then } \alpha_M = 1$$

$$\alpha_0 = (\alpha_A/\alpha_M) + (\alpha_B/\alpha_M) - 1, \text{ if } \alpha_0 < 0 \text{ then } \alpha_n = 0$$

10. A computer graphics system according to claim 1 wherein said means for computing blended attribute pixel data signals implements a filter function centered on said pixel for computing said blended attribute.

11. For use in conjunction with a computer graphics display apparatus including a frame buffer, a process for providing picture element (pixel) signals to the frame buffer for an anti-aliased display of polygons that are defined as located at various depths along a depth dimension in a pyramid of vision (model space), the pyramid of vision being defined by a view point having at least one ray associated with a pixel of said display, said ray passing through certain of said contending polygons at various points of said polygons, said contending polygons having attributes contending for said pixel, said display being defined in two dimensional space within said pyramid of vision, and further having a determined coarseness parameter indicated in the depth dimension, said process including the steps of:

provinding representative signals for each of, a forward contending polygon and a rearward contending polygon, in the depth dimension of model space, said forward contending polygon having a forward point along said ray in said depth dimension, said rearward contending polygon having a rearward point along said ray in said depth dimension;

determining representative signals for the distance in said depth dimension between said forward point and said rearward point in model space;

providing representative signals for said coarseness parameter in model space;

computing blended attribute pixel data signals, said blended attribute pixel data being a blended attribute between said forward and rearward polygons, by correlating said representative signals for the distance in said depth dimension between said forward and said rearward points with signals representative of said coarseness parameter; and storing said blended attribute pixel data signals in said frame buffer for driving a computer graphics display.

12. A computer graphics process according to claim 11 wherein said contending polygons have attributes to represent color and said computing step computes a blended attribute of color.

13. A computer graphics process according to claim 11 wherein said contending polygons have attributes to represent obscurity and said computing step computes a blended attribute of obscurity.

14. A computer graphics process according to claim 11 wherein said contending polygons have attributes to represent depth and said computing step computes a blended attribute of depth.

15. A computer graphics process according to claim 11 further comprising a step of conditionally actuating said computing step for computing blended attribute pixel data signals controlled by said distance in relation to said coarseness parameter.

16. A computer graphics process according to claim 11 wherein said step of computing blended attribute pixel data signals computes said blended attribute pixel data signals in accordance with the equation:

$$A_M = [(\alpha_A/\alpha_M) - \alpha_0 R]A_A + [(\alpha_B/\alpha_M) - \alpha_0(1-R)]A_B$$

where $A_M$ is said blended attribute for said pixel, $\alpha_A$ represents pixel coverage of said forward point of said forward polygon, $\alpha_B$ represents pixel coverage of said rearward point of said rearward polygon, $\alpha_M$ represents a combined pixel coverage of said rearward and forward points, $\alpha_0$ represents excess of said combined pixel coverage beyond capacity of said pixel, $A_A$ represents said attribute of said forward polygon and $A_B$ represents said attribute of said rearward polygon, and R represents said correlated distance.

17. A computer graphics process according to claim 16 wherein said correlated distance R is defined in accordance with the equation:

$$R = \frac{(Z_B - Z_A)}{2\Delta} + \frac{1}{2}$$

where $Z_B$ represents position of said rearward point along said ray in said depth dimension, $Z_A$ represents position of said forward point along said ray, and $\Delta Z$ represents said coarseness parameter.

18. A computer graphics process according to claim 16 wherein said contending polygons have attributes to represent obscurity and said equation further includes parameters $O_A$ and $O_B$ representative of said obscurity of said forward polygon and said rearward polygon, respectively, as follows:

$$A_M = [(\alpha_A/\alpha_M) - \alpha_0 R O_B]A_A + [(\alpha_B/\alpha_M) - \alpha_0(1-R)O_A]A_B.$$

19. A computer graphics process according to claim 16 wherein said combined pixel coverage $\alpha_M$ and said excess pixel coverage $\alpha_0$ are defined in accordance with the equations:

$$\alpha_M = \alpha_A + \alpha_B, \text{ if } \alpha_M > 1, \text{ then } \alpha_M = 1$$

$$\alpha_0 = (\alpha_A/\alpha_M) + (\alpha_B/\alpha_M) - 1, \text{ if } \alpha_0 < 0 \text{ then } \alpha_B = 0$$

20. A computer graphics process according to claim 11 wherein said step of computing blended attribute pixel data signals implements a filter function centered on said pixel for computing said blended attribute.

* * * * *

UNITED STATES PATENT AND TRADEMARK OFFICE
CERTIFICATE OF CORRECTION

PATENT NO. : 5,490,238
DATED : February 6, 1996
INVENTOR(S) : Gary S. Watkins

Page 1 of 4

It is certified that error appears in the above-indentified patent and that said Letters Patent is hereby corrected as shown below:

Column 1, line 15, add a quote after comma;

Column 1, line 47, change "Andri" to --Andries--;

Column 2, line 34, no hyphen between "hidden" and "surface";

Column 3, line 14, change "Df" to --of--;

Column 3, line 47, the "s" after "screen" should be capitalized;

Column 4, line 61, insert "$\Delta Z.$" after "parameter";

Column 5, line 10, after "an" insert the following: --enlarged plan view of the pixel at the screen S (FIGURE 1). It may be seen that the combined representations of--;

Column 5, line 17, instead of "a" insert an alpha sign "$\alpha$";

Column 5, line 39, after $\alpha_A$, delete "reprepolygon";

Column 5, lines 40-44, delete all text between "$PB2_a$" on line 40 and "in" on line 44;

Column 5, line 45, delete "the pixel do not exceed the" and insert the following text: --represents the extent by which the polygon $PA2_a$ partially covers the pixel, $\alpha_B$ represents the extent by which the polygon $PB2_a$ partially covers the pixel, and $\alpha_M$ represents the extent by which the combined representations of the polygons $PA2_a$ and $PB2_a$ partially cover the pixel.--;

UNITED STATES PATENT AND TRADEMARK OFFICE
CERTIFICATE OF CORRECTION

PATENT NO. : 5,490,238
DATED : February 6, 1996
INVENTOR(S) : Gary S. Watkins

It is certified that error appears in the above-indentified patent and that said Letters Patent is hereby corrected as shown below:

Column 5, line 48, insert comma after "121";

Column 6, line 4, no period after "In";

Column 6, line 32, change "s" to an alpha sign "$\alpha$";

Column 6, line 43, after "Porter", please delete the comma;

Column 6, line 62, change "s" to an alpha sign "$\alpha$";

Column 6, line 65, insert a plus sign between $\alpha_A$ and $\alpha_B$;
Column 7, line 30, change "q.verlap" to "overlap";

Column 7, line 41, change "Sununarizing" to "Summarizing";

Column 7, line 62, add a period after "½$\Delta$Z";

Column 8, line 15, change "dR" to "$\Delta$R";

Column 8, line 29, change "dimensien" to "dimension";

Column 8, last line, change "60" to an alpha sign "$\alpha$";

Column 9, line 5, change "$\alpha_B$/$\alpha$M" to "$\alpha_B$/$\alpha_M$";

Column 9, line 40, insert a comma after "Graphics"";

Column 10, line 4, change "computer R unit" to "compute R unit 58";

UNITED STATES PATENT AND TRADEMARK OFFICE
CERTIFICATE OF CORRECTION

PATENT NO. : 5,490,238
DATED : February 6, 1996
INVENTOR(S) : Gary S. Watkins

It is certified that error appears in the above-indentified patent and that said Letters Patent is hereby corrected as shown below:

Column 10, line 10, change "comparato$_r$" to "comparator";

Column 10, line 12, change "dR" to "$\Delta R$";

Column 11, lines 22-23, change "cooperation" to "operation";

Column 11, line 23, insert "to" in between "mixers" and "segregate";

Column 11, line 54, delete the hyphen in between "the" and "sequence";

Column 12, line 2, change "PMB" to "PM$_B$";

Column 12, line 26, change "dR" to "$\Delta R$";

Column 13, line 7, delete "35";

Column 13, line 10, change "dR rs." to "$\Delta R$ vs.";

Column 14, line 29, add "/" in between "$\alpha_A$" and "$\alpha_M$";

Column 14, line 45, in the denominator of the equation, please change "$2\Delta$" to "$2\Delta Z$";

Column 14, line 47, please change "$Z_R$" to "$Z_B$";

Column 14, line 52, change "graphies" to "graphics";

UNITED STATES PATENT AND TRADEMARK OFFICE
CERTIFICATE OF CORRECTION

PATENT NO. : 5,490,238
DATED : February 6, 1996
INVENTOR(S) : Gary S. Watkins

It is certified that error appears in the above-indentified patent and that said Letters Patent is hereby corrected as shown below:

Column 14, line 57, change "+$[(\alpha_A/\alpha_M)]$" to "+$[(\alpha_B/\alpha_M)]$";

Column 14, line 64, change "$\alpha_n=0$" to "$\alpha_o=0$";

Column 16, line 8, change "$A_R$" to "$A_B$";

Column 16, line 25, in the denominator of the equation, please change "$2\Delta$" to "$2\Delta Z$";

Column 16, line 47, change "$\alpha_M/\alpha_M$" to "$\alpha_A/\alpha_M$"; and

Column 16, line 47, change "$\alpha_B=0$" to "$\alpha_o=0$"

Signed and Sealed this

Thirtieth Day of July, 1996

Attest:

BRUCE LEHMAN

Attesting Officer          Commissioner of Patents and Trademarks